(12) United States Patent
Sanders et al.

(10) Patent No.: US 12,275,082 B2
(45) Date of Patent: Apr. 15, 2025

(54) CONSUMABLE CARTRIDGE FOR A PLASMA ARC CUTTING SYSTEM

(71) Applicant: Hypertherm, Inc., Hanover, NH (US)

(72) Inventors: Nicholas A. Sanders, Enfield, NH (US); Peter J. Twarog, Meriden, NH (US); E. Michael Shipulski, Etna, NH (US); Yu Zhang, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 18/203,981

(22) Filed: May 31, 2023

(65) Prior Publication Data

US 2024/0109147 A1 Apr. 4, 2024

Related U.S. Application Data

(63) Continuation of application No. 17/164,106, filed on Feb. 1, 2021, now Pat. No. 11,684,994, which is a
(Continued)

(51) Int. Cl.
*B23K 10/00* (2006.01)
*H05H 1/34* (2006.01)

(52) U.S. Cl.
CPC ............ *B23K 10/006* (2013.01); *B23K 10/00* (2013.01); *H05H 1/34* (2013.01); *H05H 1/3457* (2021.05);
(Continued)

(58) Field of Classification Search
CPC ........ B23K 10/00; B23K 10/006; B23K 9/29; H05H 1/34; H05H 1/3457; H05H 1/3489; H05H 1/3494
(Continued)

(56) References Cited

U.S. PATENT DOCUMENTS

| 2,985,050 | A | 5/1961 | Schwacha |
| 3,018,360 | A | 1/1962 | Engel |

(Continued)

FOREIGN PATENT DOCUMENTS

| CN | 1642685 A | 7/2005 |
| CN | 1919516 A | 2/2007 |

(Continued)

OTHER PUBLICATIONS

Amada America Inc., "Amada WACS System", Retrieved from the internet at: http://www.amada.de/en/laser/wacs-system.html, printed Oct. 27, 2016, 2 pages.
(Continued)

*Primary Examiner* — Dana Ross
*Assistant Examiner* — Joseph W Iskra
(74) *Attorney, Agent, or Firm* — Cesari and McKenna, LLP (57) ABSTRACT

The invention features a replaceable cartridge for a plasma arc torch. The cartridge includes a cartridge body having a first section and a second section. The first and second sections are joined at an interface to form a substantially hollow chamber. The interface provides a coupling force that secures the first and second sections together. The cartridge also includes an arc constricting member located in the second section; an electrode included within the substantially hollow chamber; and a contact start spring element affixed to the electrode. The spring element imparts a separating force that biases the electrode toward at least one of the first section or the second section of the body. The separating force has a magnitude that is less than a magnitude of the coupling force.

22 Claims, 6 Drawing Sheets

Related U.S. Application Data continuation of application No. 15/971,703, filed on May 4, 2018, now Pat. No. 10,960,485, which is a continuation-in-part of application No. 14/824,946, filed on Aug. 12, 2015, now Pat. No. 10,582,605, and a continuation-in-part of application No. 14/708,972, filed on May 11, 2015, now Pat. No. 10,456,855, and a continuation of application No. 14/708,957, filed on May 11, 2015, now Pat. No. 9,981,335, which is a continuation-in-part of application No. PCT/US2014/056546, filed on Sep. 19, 2014, and a continuation-in-part of application No. 14/079,163, filed on Nov. 13, 2013, now abandoned.

(60) Provisional application No. 62/036,393, filed on Aug. 12, 2014, provisional application No. 61/991,114, filed on May 9, 2014.

(52) U.S. Cl.
CPC ......... *H05H 1/3489* (2021.05); *H05H 1/3494* (2021.05)

(58) Field of Classification Search
USPC .................................................. 219/121.51
See application file for complete search history.

(56) References Cited

U.S. PATENT DOCUMENTS

| | | |
|---|---|---|
| 3,153,133 A | 10/1964 | Ducati |
| 3,279,177 A | 10/1966 | Ducati |
| 3,294,953 A | 12/1966 | Spies |
| 3,518,401 A | 6/1970 | Mathews |
| 3,684,911 A | 8/1972 | Perugini et al. |
| 3,794,806 A | 2/1974 | Klasson |
| 3,996,070 A | 12/1976 | Fletcher et al. |
| 4,011,996 A | 3/1977 | Tsuji et al. |
| 4,034,250 A | 7/1977 | Kiselev et al. |
| 4,087,050 A | 5/1978 | Tsuji et al. |
| 4,125,754 A | 11/1978 | Wasserman et al. |
| 4,311,897 A | 1/1982 | Yerushalmy |
| 4,355,262 A | 10/1982 | Chan et al. |
| 4,519,835 A | 5/1985 | Gauvin et al. |
| 4,570,048 A | 2/1986 | Poole |
| 4,620,080 A | 10/1986 | Arata et al. |
| 4,682,005 A | 7/1987 | Marhic |
| 4,687,139 A | 8/1987 | Lockwood |
| 4,733,052 A | 3/1988 | Nilsson et al. |
| 4,748,312 A | 5/1988 | Hatch et al. |
| 4,783,004 A | 11/1988 | Lockwood |
| 4,896,016 A | 1/1990 | Broberg et al. |
| 4,914,271 A | 4/1990 | Delzenne et al. |
| 4,924,060 A | 5/1990 | Delzenne |
| 4,929,811 A | 5/1990 | Blankenship |
| 4,940,877 A | 7/1990 | Broberg |
| 4,948,485 A | 8/1990 | Wallsten et al. |
| 4,967,055 A | 10/1990 | Raney et al. |
| 4,982,067 A | 1/1991 | Marantz et al. |
| 5,013,885 A | 5/1991 | Carkhuff |
| 5,018,670 A | 5/1991 | Chalmers |
| 5,023,425 A | 6/1991 | Severance, Jr. |
| 5,132,512 A | 7/1992 | Sanders et al. |
| 5,144,110 A | 9/1992 | Marantz et al. |
| 5,170,033 A | 12/1992 | Couch, Jr. |
| 5,183,646 A | 2/1993 | Anderson et al. |
| 5,200,595 A | 4/1993 | Boulos et al. |
| 5,208,441 A | 5/1993 | Broberg |
| 5,216,221 A | 6/1993 | Carkhuff |
| 5,239,161 A | 8/1993 | Lang |
| 5,248,867 A | 9/1993 | Ohba et al. |
| 5,309,683 A | 5/1994 | Hockett |
| 5,317,126 A | 5/1994 | Couch, Jr. et al. |
| 5,390,964 A | 2/1995 | Gray, Jr. |
| 5,409,164 A | 4/1995 | Delzenne et al. |
| 5,440,477 A | 5/1995 | Rohrberg et al. |
| 5,502,245 A | 3/1996 | Dassel et al. |
| 5,518,221 A | 5/1996 | Zurecki et al. |
| 5,556,562 A | 9/1996 | Sorenson |
| 5,558,842 A | 9/1996 | Vassiliou et al. |
| 5,560,844 A | 10/1996 | Boulos et al. |
| 5,580,531 A | 12/1996 | Vassiliou et al. |
| 5,624,586 A | 4/1997 | Sobr et al. |
| 5,643,058 A | 7/1997 | Erichsen et al. |
| 5,695,662 A | 12/1997 | Couch, Jr. et al. |
| 5,717,187 A | 2/1998 | Rogozinski et al. |
| 5,726,414 A | 3/1998 | Kitahashi |
| 5,796,067 A | 8/1998 | Enyedy et al. |
| 5,801,282 A | 9/1998 | Dassel et al. |
| 5,841,095 A | 11/1998 | Lu et al. |
| 5,844,196 A | 12/1998 | Oakley |
| 5,860,849 A | 1/1999 | Miller |
| 5,874,707 A | 2/1999 | Iida et al. |
| 5,886,315 A | 3/1999 | Lu et al. |
| 5,897,795 A | 4/1999 | Lu et al. |
| 5,968,379 A | 10/1999 | Zhao et al. |
| 5,994,663 A | 11/1999 | Lu |
| 6,084,199 A | 7/2000 | Lindsay et al. |
| 6,096,993 A | 8/2000 | Marhic et al. |
| 6,133,542 A | 10/2000 | Dvorak et al. |
| 6,147,318 A | 11/2000 | Marhic |
| 6,156,995 A | 12/2000 | Severance, Jr. et al. |
| 6,163,008 A | 12/2000 | Roberts et al. |
| 6,169,264 B1 | 1/2001 | Marhic |
| 6,207,923 B1 | 3/2001 | Lindsay |
| 6,248,975 B1 | 6/2001 | Lanouette et al. |
| 6,256,873 B1 | 7/2001 | Tiffany et al. |
| 6,320,156 B1 | 11/2001 | Yamaguchi et al. |
| 6,337,460 B2 | 1/2002 | Kelkar et al. |
| 6,365,867 B1 | 4/2002 | Hooper |
| 6,444,945 B1 | 9/2002 | Maschwitz et al. |
| 6,515,252 B1 | 2/2003 | Girold |
| 6,525,292 B1 | 2/2003 | Girold |
| 6,539,813 B1 | 4/2003 | Horiuchi et al. |
| 6,616,767 B2 | 9/2003 | Zhao et al. |
| 6,657,162 B1 | 12/2003 | Jung et al. |
| 6,659,098 B1 | 12/2003 | Sekiva |
| 6,703,581 B2 | 3/2004 | Jones et al. |
| 6,713,711 B2 | 3/2004 | Conway et al. |
| 6,717,096 B2 * | 4/2004 | Hewett .................. H05H 1/34 219/121.48 |
| 6,729,468 B1 | 5/2004 | Dobmeier |
| 6,774,336 B2 | 8/2004 | Horner-Richardson |
| 6,800,336 B1 | 10/2004 | Fornsel et al. |
| 6,836,698 B2 | 12/2004 | Fujishima et al. |
| 6,851,627 B2 | 2/2005 | Hashish et al. |
| 6,852,944 B2 | 2/2005 | MacKenzie et al. |
| 6,852,949 B2 | 2/2005 | Lanouette et al. |
| 6,881,921 B2 | 4/2005 | Homer-Richardson et al. |
| 6,888,092 B2 | 5/2005 | Walters |
| 6,903,301 B2 | 6/2005 | Jones et al. |
| 6,919,526 B2 | 7/2005 | Kinerson et al. |
| 6,936,786 B2 | 8/2005 | Hewett et al. |
| 6,946,616 B2 | 9/2005 | Kinerson et al. |
| 6,989,505 B2 | 1/2006 | MacKenzie et al. |
| 7,030,337 B2 | 4/2006 | Baker |
| 7,115,833 B2 | 10/2006 | Higgins et al. |
| 7,142,115 B2 | 11/2006 | Waters |
| 7,161,111 B2 | 1/2007 | Schneider |
| 7,196,283 B2 | 3/2007 | Buchberger et al. |
| 7,202,440 B2 | 4/2007 | Hewett et al. |
| 7,220,937 B2 | 5/2007 | Hofman et al. |
| 7,375,302 B2 | 5/2008 | Twarog et al. |
| 7,411,149 B2 | 8/2008 | Schneider |
| 7,423,235 B2 | 9/2008 | Severance, Jr. |
| 7,598,473 B2 | 10/2009 | Cook et al. |
| 7,615,720 B2 | 11/2009 | Sanders |
| 7,622,693 B2 | 11/2009 | Foret |
| 7,651,269 B2 | 1/2010 | Comendant |
| 7,671,294 B2 | 3/2010 | Belashchenko et al. |
| 7,728,401 B2 | 6/2010 | Takatori |
| 7,755,484 B2 | 7/2010 | Cullen et al. |
| 7,759,599 B2 | 7/2010 | Hawley et al. |

(56) References Cited

U.S. PATENT DOCUMENTS

| | | |
|---|---|---|
| 7,762,869 B2 | 7/2010 | Yoon |
| 7,927,094 B2 | 4/2011 | Fong et al. |
| 8,030,592 B2 | 10/2011 | Weidman |
| 8,035,055 B2 | 10/2011 | Twarog et al. |
| 8,035,487 B2 | 10/2011 | Malackowski |
| 8,085,150 B2 | 12/2011 | Oberle |
| 8,089,025 B2 | 1/2012 | Sanders |
| 8,097,828 B2 | 1/2012 | Roberts et al. |
| 8,115,136 B2 | 2/2012 | Mather et al. |
| 8,141,240 B2 | 3/2012 | Hiew et al. |
| 8,203,095 B2 | 6/2012 | Storem et al. |
| 8,222,561 B2 | 7/2012 | Renault |
| 8,242,907 B2 | 8/2012 | Butler et al. |
| D669,508 S | 10/2012 | Krink et al. |
| 8,338,740 B2 | 12/2012 | Liebold et al. |
| 8,373,084 B2 | 2/2013 | Salsich |
| 8,389,887 B2 | 3/2013 | Liebold et al. |
| 8,395,076 B2 | 3/2013 | Matus |
| 8,395,077 B2 | 3/2013 | Duan et al. |
| 8,455,786 B2 | 6/2013 | Fang |
| 8,546,719 B2 | 10/2013 | Warren, Jr. et al. |
| 8,575,510 B2 | 11/2013 | Laurish et al. |
| 8,581,139 B2 | 11/2013 | Severance, Jr. |
| 8,620,738 B2 | 12/2013 | Fordyce, III et al. |
| 8,624,150 B2 | 1/2014 | Simek et al. |
| 8,633,422 B2 | 1/2014 | Giese |
| 8,658,941 B2 | 2/2014 | Albrecht |
| 8,698,036 B1 | 4/2014 | Zhang et al. |
| 8,698,306 B2 | 4/2014 | Yu et al. |
| 8,748,776 B2 | 6/2014 | Albrecht et al. |
| 8,759,715 B2 | 6/2014 | Narayanan et al. |
| 8,790,447 B2 | 7/2014 | Bieri et al. |
| 8,853,588 B2 | 10/2014 | Mao et al. |
| 8,859,828 B2 | 10/2014 | Liu et al. |
| 8,921,731 B2 | 12/2014 | Krink et al. |
| 9,144,882 B2 | 9/2015 | Lindsay et al. |
| 9,157,360 B2 | 10/2015 | Hoy-Peterson et al. |
| 9,229,436 B2 | 1/2016 | Stumpfl et al. |
| 9,233,480 B2 | 1/2016 | Nagai et al. |
| 9,316,546 B2 | 4/2016 | Tsubaki et al. |
| 9,395,715 B2 | 7/2016 | Brandt et al. |
| 9,398,679 B2 | 7/2016 | Namburu |
| 9,481,050 B2 | 11/2016 | Brine et al. |
| 9,492,883 B2 | 11/2016 | Mather et al. |
| 9,550,251 B2 | 1/2017 | Guilotta |
| 9,609,733 B2 | 3/2017 | Severance |
| 9,643,273 B2 | 5/2017 | Adams et al. |
| 9,672,460 B2 | 6/2017 | Hoffa et al. |
| 9,686,850 B2 | 6/2017 | Girold et al. |
| 9,724,787 B2 | 8/2017 | Becker et al. |
| 9,737,954 B2 | 8/2017 | Hoffa et al. |
| 9,781,816 B2 | 10/2017 | Cook et al. |
| 9,782,852 B2 | 10/2017 | Mao et al. |
| 9,967,964 B2 | 5/2018 | Kim et al. |
| 9,981,335 B2 | 5/2018 | Sanders et al. |
| 9,993,934 B2 | 6/2018 | Vandergon et al. |
| 10,076,019 B2 | 9/2018 | Carletti |
| 10,278,274 B2 | 4/2019 | Sanders et al. |
| 10,314,155 B2 | 6/2019 | Patel et al. |
| 10,321,551 B2 | 6/2019 | Zhang et al. |
| 10,346,647 B2 | 7/2019 | Hoffa et al. |
| 10,455,682 B2 | 10/2019 | Shipulski et al. |
| 10,456,855 B2 | 10/2019 | Sanders et al. |
| 10,462,891 B2 | 10/2019 | Zhang et al. |
| 10,486,260 B2 | 11/2019 | Hoffa et al. |
| 10,555,410 B2 | 2/2020 | Sanders et al. |
| 10,561,009 B2 | 2/2020 | Sanders et al. |
| 10,582,605 B2 | 3/2020 | Zhang et al. |
| 10,609,805 B2 | 3/2020 | Sanders et al. |
| 10,713,448 B2 | 7/2020 | Hoffa et al. |
| 10,786,924 B2 | 9/2020 | Vandergon et al. |
| 10,882,133 B2 | 1/2021 | Jansma |
| 10,912,183 B2 | 2/2021 | Zhang et al. |
| 10,960,485 B2 | 3/2021 | Sanders et al. |
| 11,087,100 B2 | 8/2021 | Hoffa et al. |
| 11,110,626 B2 | 9/2021 | Vandergon et al. |
| 11,278,983 B2 | 3/2022 | Sanders et al. |
| 11,331,743 B2 | 5/2022 | Hoffa et al. |
| 11,432,393 B2 | 8/2022 | Duan et al. |
| 11,610,218 B2 | 3/2023 | Young, Jr. et al. |
| 11,665,807 B2 | 5/2023 | Sanders et al. |
| 11,684,994 B2 | 6/2023 | Sanders et al. |
| 11,684,995 B2 | 6/2023 | Zhang et al. |
| 11,707,860 B2 | 7/2023 | Vandergon et al. |
| 11,770,891 B2 | 9/2023 | Zhang et al. |
| 11,783,138 B2 | 10/2023 | Hoffa et al. |
| 2002/0012756 A1 | 1/2002 | Kuckertz et al. |
| 2002/0117482 A1 | 8/2002 | Hewett et al. |
| 2002/0117483 A1 | 8/2002 | Jones et al. |
| 2002/0117484 A1 | 8/2002 | Jones et al. |
| 2002/0194064 A1 | 12/2002 | Parry et al. |
| 2003/0029934 A1 | 2/2003 | Hashish et al. |
| 2003/0085205 A1 | 5/2003 | Lai et al. |
| 2003/0148709 A1 | 8/2003 | Anand et al. |
| 2003/0213784 A1 | 11/2003 | MacKenzie et al. |
| 2004/0000538 A1 | 1/2004 | Conway et al. |
| 2004/0004064 A1 | 1/2004 | Lanouette et al. |
| 2004/0004113 A1 | 1/2004 | Blankenship |
| 2004/0173583 A1 | 9/2004 | Iriyama et al. |
| 2004/0177807 A1 | 9/2004 | Pui et al. |
| 2004/0193307 A1 | 9/2004 | Fujishima et al. |
| 2004/0195217 A1 | 10/2004 | Conway et al. |
| 2004/0195219 A1 | 10/2004 | Conway et al. |
| 2004/0200810 A1 | 10/2004 | Brandt et al. |
| 2005/0035093 A1 | 2/2005 | Yamaguchi |
| 2005/0045599 A1 | 3/2005 | Matus |
| 2005/0173390 A1 | 8/2005 | Lanouette et al. |
| 2005/0266777 A1 | 12/2005 | Yoon |
| 2006/0016789 A1* | 1/2006 | MacKenzie ............... H05H 1/28 219/121.5 |
| 2006/0037945 A1 | 2/2006 | Schneider |
| 2006/0163216 A1 | 7/2006 | Brandt et al. |
| 2006/0181420 A1 | 8/2006 | Ishii |
| 2006/0215389 A1 | 9/2006 | Forsbinder et al. |
| 2006/0289397 A1 | 12/2006 | Mahawill |
| 2006/0289398 A1 | 12/2006 | Cook et al. |
| 2006/0289406 A1 | 12/2006 | Helenius et al. |
| 2007/0044449 A1 | 3/2007 | O'Brien et al. |
| 2007/0045241 A1 | 3/2007 | Schneider et al. |
| 2007/0082532 A1 | 4/2007 | Morris |
| 2007/0082533 A1 | 4/2007 | Currier et al. |
| 2007/0090168 A1 | 4/2007 | Snow et al. |
| 2007/0154306 A1 | 7/2007 | Anderson et al. |
| 2007/0181540 A1 | 8/2007 | Lindsay et al. |
| 2007/0193988 A1 | 8/2007 | De Joannis et al. |
| 2007/0210034 A1 | 9/2007 | Mather et al. |
| 2007/0210035 A1 | 9/2007 | Twarog et al. |
| 2007/0262060 A1 | 11/2007 | Roberts et al. |
| 2008/0003353 A1 | 1/2008 | Hardwicke et al. |
| 2008/0023451 A1 | 1/2008 | Salsich et al. |
| 2008/0083711 A1 | 4/2008 | Twarog et al. |
| 2008/0116179 A1 | 5/2008 | Cook et al. |
| 2008/0118253 A1 | 5/2008 | Abe |
| 2008/0121624 A1 | 5/2008 | Belashchenko et al. |
| 2008/0185842 A1 | 8/2008 | Blackman et al. |
| 2008/0210669 A1 | 9/2008 | Yang et al. |
| 2008/0217305 A1 | 9/2008 | Sanders |
| 2008/0237356 A1 | 10/2008 | Singleton et al. |
| 2008/0297356 A1 | 12/2008 | Oberle |
| 2008/0308535 A1 | 12/2008 | Rego et al. |
| 2009/0026180 A1 | 1/2009 | Yang et al. |
| 2009/0027782 A1 | 1/2009 | Takahashi et al. |
| 2009/0039178 A1 | 2/2009 | Yoon |
| 2009/0045174 A1 | 2/2009 | Haberler et al. |
| 2009/0078196 A1 | 3/2009 | Midorikawa |
| 2009/0152255 A1 | 6/2009 | Ma et al. |
| 2009/0159571 A1 | 6/2009 | Salsich |
| 2009/0159577 A1 | 6/2009 | Sommerfeld |
| 2009/0170364 A1 | 7/2009 | Scholler et al. |
| 2009/0175694 A1 | 7/2009 | Craig et al. |
| 2009/0206721 A1 | 8/2009 | Foret |
| 2009/0206722 A1 | 8/2009 | Foret |
| 2009/0219136 A1 | 9/2009 | Brunet et al. |
| 2009/0230095 A1 | 9/2009 | Liebold et al. |

(56) References Cited

U.S. PATENT DOCUMENTS

| | | |
|---|---|---|
| 2009/0230097 A1 | 9/2009 | Liebold et al. |
| 2009/0240368 A1 | 9/2009 | Youna, Jr. et al. |
| 2009/0277882 A1 | 11/2009 | Bornemann |
| 2009/0294415 A1 | 12/2009 | Salsich et al. |
| 2009/0312862 A1 | 12/2009 | Fagan |
| 2010/0046210 A1 | 4/2010 | Mathai et al. |
| 2010/0078408 A1 | 4/2010 | Liebold et al. |
| 2010/0084381 A1 | 4/2010 | Indraczek et al. |
| 2010/0133241 A1 | 6/2010 | Wilhelm et al. |
| 2010/0264120 A1 | 10/2010 | Reinke et al. |
| 2010/0314361 A1 | 12/2010 | Buccella |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0042358 A1 | 2/2011 | Albanese et al. |
| 2011/0284502 A1 | 11/2011 | Krink et al. |
| 2012/0012560 A1 | 1/2012 | Roberts et al. |
| 2012/0012564 A1 | 1/2012 | Mao et al. |
| 2012/0012565 A1 | 1/2012 | Zhang et al. |
| 2012/0036832 A1 | 2/2012 | Hoy-Petersen et al. |
| 2012/0055907 A1 | 3/2012 | Allimant et al. |
| 2012/0058649 A1 | 3/2012 | Okumura et al. |
| 2012/0060691 A1 | 3/2012 | Bieri et al. |
| 2012/0103946 A1 | 5/2012 | Krink et al. |
| 2012/0139692 A1 | 6/2012 | Neubauer et al. |
| 2012/0152913 A1 | 6/2012 | Mather et al. |
| 2012/0181257 A1 | 7/2012 | Mather et al. |
| 2012/0246922 A1 | 10/2012 | Hussary et al. |
| 2012/0247293 A1 | 10/2012 | Nagai et al. |
| 2012/0248073 A1 | 10/2012 | Conway et al. |
| 2012/0261392 A1 | 10/2012 | Barnett et al. |
| 2013/0001221 A1 | 1/2013 | Lambert |
| 2013/0043222 A1* | 2/2013 | Leiteritz ............... B23K 10/00 |
| | | 219/121.48 |
| 2013/0043223 A1 | 2/2013 | Leitteritz et al. |
| 2013/0043224 A1 | 2/2013 | Lieteritz et al. |
| 2013/0087535 A1 | 4/2013 | Barnett et al. |
| 2013/0103466 A1 | 4/2013 | Fisher |
| 2013/0126487 A1 | 5/2013 | Crowe |
| 2013/0153545 A1 | 6/2013 | Kim et al. |
| 2013/0163637 A1 | 6/2013 | Parsons et al. |
| 2013/0167697 A1 | 7/2013 | Reukers |
| 2013/0179241 A1 | 7/2013 | Liu |
| 2013/0248497 A1 | 9/2013 | Stoeger et al. |
| 2013/0253728 A1 | 9/2013 | Stumpfl et al. |
| 2013/0263420 A1 | 10/2013 | Shipulski |
| 2014/0021172 A1 | 1/2014 | Sanders et al. |
| 2014/0023856 A1 | 1/2014 | Bisges et al. |
| 2014/0029178 A1 | 1/2014 | Trudeau, Jr. et al. |
| 2014/0061170 A1 | 3/2014 | Lindsay et al. |
| 2014/0069895 A1 | 3/2014 | Brine et al. |
| 2014/0076861 A1 | 3/2014 | Cornelius et al. |
| 2014/0113527 A1 | 4/2014 | Lindsay et al. |
| 2014/0116217 A1 | 5/2014 | Hashish |
| 2014/0165807 A1 | 6/2014 | David et al. |
| 2014/0170935 A1 | 6/2014 | Maurer |
| 2014/0217070 A1 | 8/2014 | Pikus et al. |
| 2014/0235140 A1 | 8/2014 | Maurer |
| 2015/0001193 A1 | 1/2015 | Mao et al. |
| 2015/0021302 A1 | 1/2015 | Zhang et al. |
| 2015/0027998 A1 | 1/2015 | Brine et al. |
| 2015/0076819 A1 | 3/2015 | Mather et al. |
| 2015/0105898 A1 | 4/2015 | Adams et al. |
| 2015/0108223 A1 | 4/2015 | Weitzhandler |
| 2015/0127137 A1 | 5/2015 | Brandt et al. |
| 2015/0129562 A1 | 5/2015 | Severance, Jr. |
| 2015/0181686 A1 | 6/2015 | Schulze et al. |
| 2015/0196989 A1 | 7/2015 | Hashish et al. |
| 2015/0251267 A1 | 9/2015 | Winn et al. |
| 2015/0251331 A1 | 9/2015 | Vandergon et al. |
| 2015/0269603 A1 | 9/2015 | Young, Jr. et al. |
| 2015/0273617 A1 | 10/2015 | Gullotta |
| 2015/0319835 A1 | 11/2015 | Sanders et al. |
| 2015/0319836 A1 | 11/2015 | Sanders et al. |
| 2015/0332071 A1 | 11/2015 | Hoffa et al. |
| 2015/0351213 A1 | 12/2015 | Crowe et al. |
| 2015/0351214 A1 | 12/2015 | Patel et al. |
| 2015/0371129 A1 | 12/2015 | Hoffa et al. |
| 2016/0050740 A1 | 2/2016 | Zhang et al. |
| 2016/0113102 A1 | 4/2016 | Cook et al. |
| 2016/0120015 A1 | 4/2016 | Crowe |
| 2016/0165711 A1 | 6/2016 | Zhang et al. |
| 2016/0165712 A1 | 6/2016 | Zhang et al. |
| 2016/0174353 A1 | 6/2016 | Mitra et al. |
| 2016/0221108 A1 | 8/2016 | Hoffa et al. |
| 2016/0230763 A1 | 8/2016 | Iqnatiev et al. |
| 2016/0314938 A1 | 10/2016 | Park |
| 2016/0375519 A1 | 12/2016 | Crowe |
| 2017/0042011 A1 | 2/2017 | Sanders et al. |
| 2017/0042012 A1 | 2/2017 | Sanders et al. |
| 2017/0042013 A1 | 2/2017 | Sanders et al. |
| 2017/0042014 A1 | 2/2017 | Sanders et al. |
| 2017/0046544 A1 | 2/2017 | Ikemoto |
| 2017/0091634 A1 | 3/2017 | Ritter |
| 2017/0124360 A1 | 5/2017 | Young, Jr. et al. |
| 2018/0007774 A1 | 1/2018 | Crowe |
| 2018/0099378 A1 | 4/2018 | Hashish et al. |
| 2018/0228013 A1 | 8/2018 | Zhang et al. |
| 2018/0232545 A1 | 8/2018 | Hoffa et al. |
| 2018/0250765 A1 | 9/2018 | Sanders et al. |
| 2018/0257164 A1 | 9/2018 | Zhang |
| 2018/0257253 A1 | 9/2018 | Vandergon et al. |
| 2019/0261501 A1 | 8/2019 | Zhang et al. |
| 2019/0269002 A1 | 8/2019 | Zhang et al. |
| 2019/0303629 A1 | 10/2019 | Hoffa et al. |
| 2019/0344466 A1 | 11/2019 | Vandergon et al. |
| 2020/0023456 A1 | 1/2020 | Sanders et al. |
| 2020/0055138 A1 | 2/2020 | Hoffa et al. |
| 2020/0070275 A1 | 3/2020 | Sanders et al. |
| 2020/0077504 A1 | 3/2020 | Duan et al. |
| 2020/0196426 A1 | 6/2020 | Sanders et al. |
| 2020/0293727 A1 | 9/2020 | Hoffa et al. |
| 2021/0029814 A1 | 1/2021 | Zhang et al. |
| 2021/0136905 A1 | 5/2021 | Zhang et al. |
| 2021/0178505 A1 | 6/2021 | Sanders et al. |
| 2022/0055245 A1 | 2/2022 | Vandergon et al. |
| 2022/0108087 A1 | 4/2022 | Hoffa et al. |
| 2023/0254964 A1 | 8/2023 | Sanders et al. |
| 2023/0271268 A1 | 8/2023 | Zhang et al. |
| 2023/0311359 A1 | 10/2023 | Midura et al. |
| 2023/0419055 A1 | 12/2023 | Hoffa et al. |
| 2024/0109147 A1 | 4/2024 | Sanders et al. |

FOREIGN PATENT DOCUMENTS

| | | |
|---|---|---|
| CN | 101529999 A | 9/2009 |
| CN | 101554099 A | 10/2009 |
| CN | 101992339 A | 3/2011 |
| CN | 104081882 A | 10/2014 |
| CN | 106180996 A | 12/2016 |
| CN | 106573329 A | 4/2017 |
| CN | 106576418 A | 4/2017 |
| CN | 108136532 A | 6/2018 |
| DE | 202013010576 U1 | 2/2014 |
| EA | 1829 B1 | 8/2001 |
| EP | 0079019 A | 5/1983 |
| EP | 0591018 A1 | 4/1994 |
| EP | 0875329 A1 | 11/1998 |
| EP | 1117279 A1 | 7/2001 |
| EP | 1893004 A1 | 2/2008 |
| EP | 1988324 A2 | 11/2008 |
| EP | 2 034 805 A2 | 3/2009 |
| FR | 2700982 A1 | 8/1994 |
| FR | 2949938 A1 | 3/2011 |
| JP | 5744467 A | 3/1982 |
| JP | S61-63368 A | 4/1986 |
| JP | S61-195787 A | 8/1986 |
| JP | S63-010082 | 1/1988 |
| JP | H03-174980 | 7/1991 |
| JP | H05-154732 A | 6/1993 |
| JP | H06-262366 A | 9/1994 |
| JP | 09-063790 | 3/1997 |
| JP | H11-285831 A | 10/1999 |
| JP | 2003-025176 A | 1/2003 |

(56) References Cited

FOREIGN PATENT DOCUMENTS

| | | |
|---|---|---|
| JP | 2003-048134 A | 2/2003 |
| JP | 2009-252085 A | 10/2009 |
| JP | 2011014459 A | 1/2011 |
| JP | 2011-513072 A | 4/2011 |
| JP | 4688450 B2 | 5/2011 |
| JP | 4707108 B2 | 6/2011 |
| JP | 2012-048287 A | 3/2012 |
| JP | 2012-079221 A | 4/2012 |
| JP | 2015-515381 A | 5/2015 |
| KR | 20180040645 A | 4/2018 |
| RU | 2009815 C1 | 3/1994 |
| RU | 2066263 C1 | 9/1996 |
| RU | 95105277 A | 4/1997 |
| RU | 2279341 C2 | 7/2006 |
| RU | 2354460 C2 | 10/2008 |
| RU | 2353485 C1 | 4/2009 |
| RU | 2397848 C2 | 8/2010 |
| RU | 2456780 C2 | 7/2012 |
| RU | 150194 U1 | 2/2015 |
| SU | 1743070 A1 | 6/1994 |
| WO | WO-9621339 A1 | 7/1996 |
| WO | WO-2003-041459 A2 | 5/2003 |
| WO | WO-03/089183 A1 | 10/2003 |
| WO | WO 2007-109636 A2 | 9/2007 |
| WO | WO 2008-150136 A1 | 12/2008 |
| WO | WO 2009-076496 A2 | 6/2009 |
| WO | WO-2009-124941 A2 | 10/2009 |
| WO | WO-2015-030134 A1 | 3/2015 |
| WO | WO-2015/073522 A1 | 5/2015 |

OTHER PUBLICATIONS

Centricut catalog "2013-2014 Plasma torches and consumables", 68 pages.

Drawing of Hypertherm Part No. 120934, 2000 (redacted).

Komatsu America Industries, LLC: "Next Generation Twister TFP6062-300A Power Supply Units", Retrieved from the internet at http://www.komatsuplasma.com/kai/ctd/en/tfp6062/pdf/TFP6062_Brochure.pdf, printed Oct. 27, 2016, 2 pages.

Komatsu America Industries, LLC: "TFPL Twister Series", Retrieved from the Internet at: http://fineplasma.com/kai/ctd/en/tfp/pdf/eTFP.pdf, printed Oct. 27, 2016, 6 pages.

Thermal Dynamics XTtm-300 Brochure, May 7, 2007, http://www.mitausteel.lv/wp-content/uploads/2013/I I/V-XT300-Torch.pdf, 6 pages.

Thermal Dynamics, "XT-301 Automated Plasma Cutting Torch", retrieved from the internet at: http://victortechnologies.com/IM_Uploads/DocLib_5849_XT-301%20Torch%20for%20use%20w%20Merlin%201000%20Brochure%20(63-2524)_Nov2005.pdf: Thermadyne.

TRUMPF Inc., "TruLaser: Cost-effective cutting through thick and thin", Retrieved from the internet at http://www.us.trumpf.com/fileadmin/DAM/US.trumpf.com/Brochures/2D_Laser/TruLaser_US_10-12.pdf, printed Oct. 26, 2016, 32 pages.

Welding Magazine, "Plasma cutting system for mild steel", Oct. 2008, p. 34 retrieved from the internet at: http://search.proquest.com/professional/printviewfile?accountid=157282.

Welding Magazine, "Plasma cutting systems and products: new and or upgraded plasma cutting systems and torches have been designed to offer increased flexibility and to boost performance and productivity". Retrieved from the internet at: http://search.proquest.com/professional/printviewfile?accountid=157282, Apr. 2007, pp. 36-38.

\* cited by examiner

CONSUMABLE CARTRIDGE FOR A PLASMA ARC CUTTING SYSTEM

CROSS REFERENCE TO RELATED APPLICATIONS

This application is a continuation of U.S. Ser. No. 17/164,106, filed Feb. 1, 2021 entitled "Consumable Cartridge for a Plasma Arc Cutting System," which is a continuation of U.S. Ser. No. 15/971,703, filed May 4, 2018 entitled "Consumable Cartridge for a Plasma Arc Cutting System," which is a continuation in part of U.S. Ser. No. 14/708,972, filed May 11, 2015 and issued as U.S. Pat. No. 10,456,855 on Oct. 29, 2019, entitled "Consumable Cartridge for a Plasma Arc Cutting System." Application Ser. No. 15/971,703 is also a continuation in part of U.S. Ser. No. 14/824,946, filed Aug. 12, 2015 and issued as U.S. Pat. No. 10,582,605 on Mar. 3, 2020, entitled "Cost Effective Cartridge for a Plasma Arc Torch. Application Ser. No. 15/971,703 is also a continuation of U.S. Ser. No. 14/708,957, filed May 11, 2015 and issued as U.S. Pat. No. 9,981,335 on May 29, 2018, which is a continuation-in-part of U.S. Ser. No. 14/079,163, filed Nov. 13, 2013 and entitled "Automated Cartridge Detection for a Plasma Arc Cutting System." Application Ser. No. 14/708,957 claims the benefit of U.S. Ser. No. 61/991,114, filed May 9, 2014 and entitled "Cartridge Type Consumable Assembly for a Plasma Arc Cutting System." Application Ser. No. 14/708,957 also claims the benefit of U.S. Ser. No. 62/036,393, filed Aug. 12, 2014 and entitled "Cost Effective Cartridge for a Plasma Arc Torch." Application Ser. No. 14/708,957 is also a continuation-in-part of International Patent Application No. PCT/US14/56546, filed Sep. 19, 2014 and entitled "Thread Connection for a Torch System." The contents of all of these applications are hereby incorporated herein by reference in their entireties.

FIELD OF THE INVENTION

The invention relates generally to the field of plasma arc cutting systems and processes. More specifically, the invention relates to methods and apparatuses for simplifying, optimizing and decreasing the time and cost of cutting through the use of improved consumable cartridges.

BACKGROUND

Plasma arc torches are widely used in the cutting and marking of materials. A plasma torch generally includes an arc emitter (e.g., an electrode), an arc constrictor or constricting member (e.g., a nozzle) having a central exit orifice mounted within a torch body, electrical connections, passages for cooling, and passages for arc control fluids (e.g., plasma gas). The torch produces a constricted ionized jet of a gas with high temperature and high momentum. Gases used in the torch can be non-reactive (e.g., argon or nitrogen) or reactive (e.g., oxygen or air). During operation, a pilot arc is first generated between the arc emitter (cathode) and the arc constrictor (anode). Generation of the pilot arc can be by means of a high frequency, high voltage signal coupled to a DC power supply and the torch or by means of any of a variety of contact starting methods.

Known consumables suffer from a host of drawbacks both before and during a cutting operation. Before a cutting operation, selecting and installing the correct set of consumables for a particular cutting task can be burdensome and time-consuming. During operation, current consumables encounter performance issues such as failing to effectively dissipate and conduct heat away from the torch and failing to maintain proper consumable alignment and spacing. Furthermore, current consumables include substantial amounts of expensive materials, such as Copper and/or Vespel™, which leads to significant manufacturing costs and inhibits their widespread commercialization, production and adoption. What is needed is a new and improved consumable platform that decreases manufacturing costs, increases system performance (e.g., heat conduction, component alignment, cut quality, consumable life, variability/versatility, etc.) and eases installation and use of consumables by end users.

SUMMARY OF THE INVENTION

The present invention provides one or more cost effective cartridge designs that reduce manufacturing costs, facilitate cartridge commercialization and production, improve installation and ease of use by end users, and increase system performance. In some embodiments, numerous traditional consumable components (e.g., swirl ring, nozzle, shield, retaining cap, and electrode components) are redesigned. In some embodiments new components (e.g., an electrode sleeve, a lock ring, and/or an interfacing insulator) are created. In some embodiments, a conventional swirl ring is replaced with a different feature within the torch body that imparts a swirl to a gas flow within the torch body (e.g., a swirl feature having flow holes built directly into a body of the nozzle). In some embodiments, a nozzle shield is electrically isolated from the nozzle (e.g., by using anodized aluminum and/or plastic).

In some embodiments, each cartridge comprises one or more of the following consumable components: a frame or body having one or more sections; an arc emitter (e.g., an electrode); an arc constrictor or arc constricting member (e.g., a nozzle); a feature to impart a swirl to a gas within the plasma torch (e.g., a swirl feature built into the nozzle, a swirl ring, or another swirl feature); a shield (e.g., a nozzle shield that is electrically isolated by the use of aluminum, anodized aluminum and/or a plastic material); an emitting element (e.g., a hafnium emitter); and/or an end cap. In some embodiments, a cartridge includes a substantially copper portion (e.g., a copper inner core) and a substantially non-copper portion (e.g., a non-copper portion external to the inner core). In some embodiments, a cartridge can be used on a handheld plasma cutting system and/or a mechanized plasma cutting system.

In some embodiments, a cartridge has a resilient element, such as a spring electrode or a spring start mechanism affixed to an electrode, integrated directly into the cartridge and designed not to be separable or disassemblable from the cartridge. The resilient element can be in physical communication with the frame and/or can be configured to pass a pilot current from the frame to the arc emitter. The resilient element can bias the arc emitter in a direction along an axis of the resilient element, e.g., by imparting a separating force. In some embodiments, the separating force has a magnitude that is less than a magnitude of a coupling force holding the cartridge together.

In some embodiments, the cartridge has enhanced cooling and insulative capabilities, reduced manufacturing and material costs, and/or improved recyclability, durability and performance. In some embodiments, the cartridge provides consumable components in one integrated piece. In some embodiments, the cartridge enables a significantly reduced torch installation time (e.g., by a factor of 5-10); ensures that mating parts are always chosen correctly for a given cutting task; improves heat dissipation and/or conduction capabilities; enables easier recognition of appropriate consumable components for a given cutting task; enhances consumable alignment and/or spacing; and/or reduces operator error. In some embodiments, heat is moved substantially away from the torch, but not so far as to heat or melt plastic components. In some embodiments, using a metal besides copper (e.g., in a region outside an inner core of copper components) helps move heat away from the torch. In some embodiments, the cartridge allows specific combinations of consumables to be pre-chosen for specific cutting tasks.

In some embodiments, the cartridge frame includes a strongly thermally conductive material, e.g., aluminum, copper, or another highly conductive metal. In some embodiments, the cartridge frame is formed by molding. In some embodiments, at least one of the first end of the cartridge frame or the second end of the frame includes a threaded region shaped to engage a complementary component. In some embodiments, the shield, the arc constrictor and the frame are thermally coupled. In some embodiments, an external surface of the frame is shaped to connect to a retaining cap. In some embodiments, the cartridge includes a shield insulator connected to the frame. In some embodiments, the shield insulator is press fit to the frame.

In some embodiments, a cartridge cap defines an aperture of the arc emitter and includes a fluid sealing surface disposed about a circumference of the arc emitter aperture. In some embodiments, the electrode comprises a spring. In some embodiments, the cartridge cap extends within a base region of the arc constricting member to a location near the set of swirl holes. In some embodiments, a base of the arc constricting member is formed by molding. In some embodiments, a retaining cap is connected to the cartridge body. In some embodiments, the retaining cap comprises a plastic. In some embodiments, the arc constricting member and the electrode are connected to the retaining cap via a base of the arc constricting member.

In some embodiments, a cartridge includes a shield connected to the cartridge body. In some embodiments, the shield is connected to the cartridge body via a shield insulator. In some embodiments, the shield insulator is press fit to at least one of the shield or a base of the arc constricting member. In some embodiments, the shield insulator is electrically insulative. In some embodiments, the shield insulator is thermally conductive. In some embodiments, the shield insulator includes anodized aluminum. In some embodiments, a sleeve is disposed about a portion of the electrode. In some embodiments, the sleeve includes an anodized layer formed to electrically isolate the electrode from a base of the arc constricting member. In some embodiments, the sleeve includes a set of flow surfaces configured to facilitate fluid flow within the plasma torch, e.g., to improve cooling.

In some embodiments, a cartridge (or consumable assembly) includes a seal disposed within the cap insert. In some embodiments, a cartridge includes a retaining cap directly connected to the gas flow diverter. In some embodiments, the retaining cap is formed of a plastic. In some embodiments, the arc constrictor and the emissive member are connected to the retaining cap via a swirl ring. In some embodiments, the shield insulator is press fit to at least one of the shield and the gas flow diverter. In some embodiments, the shield insulator is electrically insulative. In some embodiments, the shield insulator is thermally conductive. In some embodiments, the shield insulator includes anodized aluminum. In some embodiments, the shield has a heat capacity to current ratio of about 2 to about 4 W/m-° K-A.

In some embodiments, the cartridge or consumable assembly includes a sleeve disposed about a portion of the emissive member. In some embodiments, the sleeve includes an anodized layer formed to electrically isolate the emissive member from a base of the arc constrictor. In some embodiments, the sleeve includes a set of flow surfaces.

In some embodiments, the cartridge is replaced as a unit. In some embodiments, a length of the emitting element can be adjusted to match the life of the nozzle, such that the cartridge parts reach the end of their useful lives at approximately the same time. In some embodiments, cut quality can be similar to that achieved using current consumables. In some embodiments, a cartridge type consumable assembly including a spring electrode disposed within a nozzle body and a sealing device disposed within a lock ring. The sealing device can be configured to connect to a plasma arc torch. The spring electrode can include a thumbtack or contact element that extends within the electrode body and is connected to a spring disposed between the contact element and the electrode body. In some embodiments, the electrode sleeves can have shaped (e.g., scooped) front ends to direct gas flow within the cartridge.

In one aspect, the invention features a replaceable cartridge for a plasma arc torch. The replaceable cartridge includes a cartridge body having a first section and a second section. The first and second sections are joined at an interface to form a substantially hollow chamber. The interface provides a coupling force that secures the first and second sections together. The cartridge also includes an arc constricting member located in the second section. The cartridge also includes an electrode included within the substantially hollow chamber. The cartridge also includes a contact start spring element affixed to the electrode. The spring element imparts a separating force that biases the electrode toward at least one of the first section or the second section of the body. The separating force has a magnitude that is less than a magnitude of the coupling force.

In some embodiments, a gas input moves the electrode and overcomes the separating force. In some embodiments, at least a portion of the electrode and the contact start spring element are irremovably disposed within the substantially hollow chamber. In some embodiments, a base of the arc constricting member is anodized. In some embodiments, the cartridge has a region with a thermal conductivity of between about 200-400 Watts per meter per degree Kelvin. In some embodiments, the shield has a heat capacity to current ratio of 2-4 W/m-° K-A. In some embodiments, the cartridge includes a cap insert connected to the second section of the cartridge body, the cap insert substantially orienting the electrode and retaining the electrode within the cartridge body.

In another aspect, the invention features a sealed cartridge unit for a plasma arc torch. The cartridge unit includes a substantially hollow frame including a first substantially hollow portion defining a first end and a second substantially hollow portion defining a second end. The cartridge unit includes an arc emitter located within the frame. The arc emitter is translatable relative to the frame. The cartridge includes an arc constrictor attached to the second end of the frame. The cartridge includes a resilient element in physical communication with the frame. The resilient element biases the arc emitter toward one of the first end or the second end to facilitate ignition at or near the arc emitter.

In some embodiments, a gas input moves the electrode and overcomes the separating force. In some embodiments, the frame includes an electrical insulator. In some embodiments, the frame includes at least one of a metal or a strongly thermally conductive material. In some embodiments, the frame is anodized. In some embodiments, the cartridge includes at least one set of flow holes, each flow hole in the set of flow holes radially offset from the other flow holes. In some embodiments, the flow holes have a total cross-sectional area of about one square inch. In some embodiments, the first end is configured to connect to a shield via a shield insulator, and the shield, the arc constrictor and the frame are thermally coupled. In some embodiments, the cartridge unit has a region with a thermal conductivity of between about 200-400 Watts per meter per degree Kelvin. In some embodiments, the cartridge includes a cartridge cap disposed in the second end of the frame, the cartridge cap shaped to contact the arc emitter and to retain the arc emitter within the frame.

In another aspect, the invention features a replaceable, unitary consumable assembly for a plasma arc torch. The consumable assembly includes a gas flow diverter, an arc constrictor in physical communication with the gas flow diverter, an emissive member disposed substantially within the gas flow diverter and the arc constrictor, and a resilient arc initiator disposed between the emissive member and at least one of the gas flow diverter or the arc constrictor. At least a portion of each of the gas flow diverter, the arc constrictor, the emissive member and the arc initiator are irremovably integrated within the consumable assembly.

In some embodiments, the emissive member includes an electrode and the arc starter includes a spring. In some embodiments, the gas flow diverter is anodized. In some embodiments, the gas flow diverter includes a cap insert located substantially opposite the arc constrictor, the cap insert substantially orienting the emissive member and retaining the emissive member within the gas flow diverter. In some embodiments, a seal is disposed within the cap insert. In some embodiments, the consumable assembly includes a shield connected to the gas flow diverter. In some embodiments, the shield is connected to the gas flow diverter via a shield insulator.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
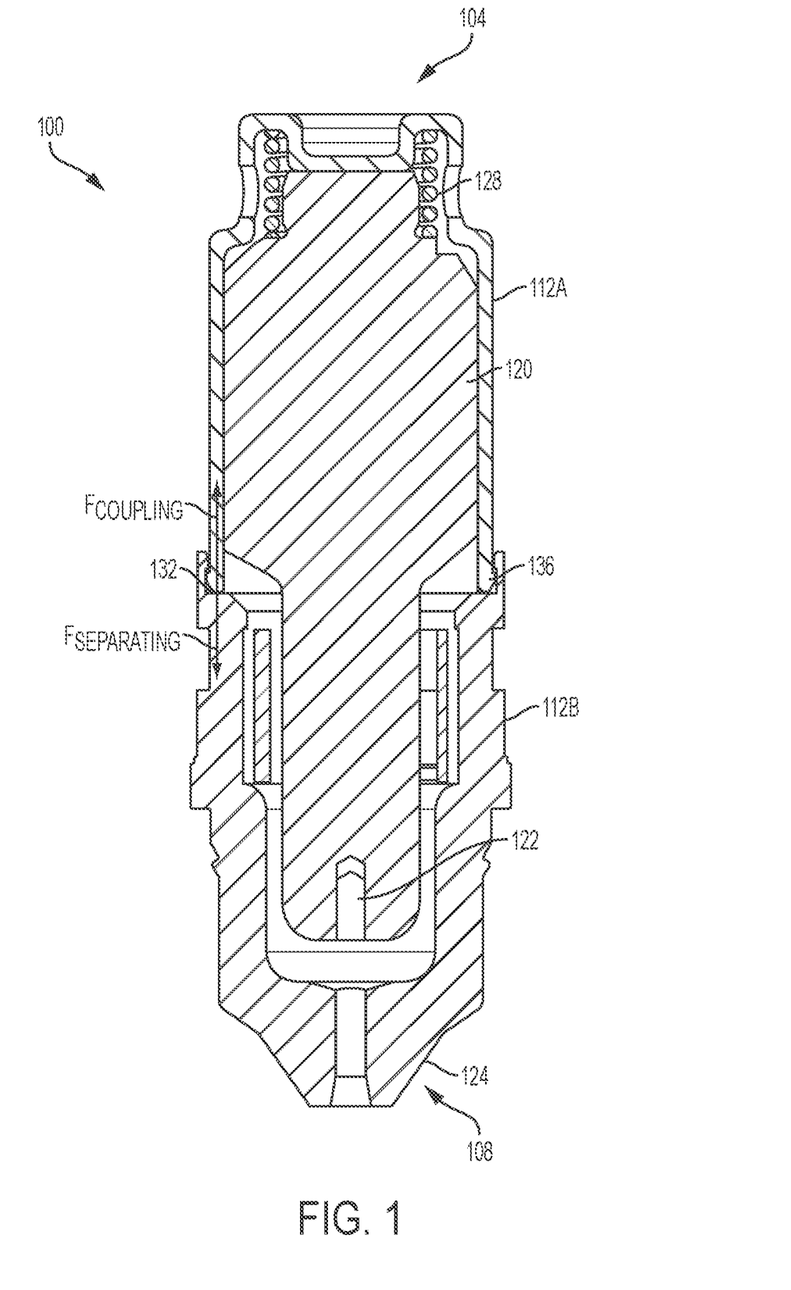
FIG. 1 is a cross-sectional schematic illustration of a cartridge for a plasma arc cutting system, according to an illustrative embodiment of the invention.

FIG. 1 is a cross-sectional schematic illustration of a cartridge 100 for a plasma arc cutting system, according to an illustrative embodiment of the invention. The cartridge 100 has a first end 104, a second end 108, and a substantially hollow frame 112 having a first section 112A toward the first end 104 and a second section 112B toward the second end 108. The cartridge 100 also includes an arc emitter 120, an arc constrictor 124, and a resilient element 128. The arc emitter 120 is located within the frame 112 and is translatable relative to the frame 112. As shown, the arc constrictor 124 forms a part of the frame 112 (e.g., at the second end 108, but in some embodiments can be attached to the frame 112). The resilient element 128 is in physical communication with the frame 112, e.g., is in direct physical communication with the first section 112A. In some embodiments, the resilient member 128 is a contact start spring element affixed to the arc emitter 120. The resilient element 128 can be configured to pass a pilot current from the frame 112 to the arc emitter 120. The resilient element 128 can bias the arc emitter 120 toward one of the first end 104 or the second end 108 to facilitate ignition at or near the arc emitter 120. The arc emitter 120 can be an electrode and can include a highly emissive element 122 such as a hafnium insert.

The first section 112A and second section 112B are joined at an interface 132 to form a substantially hollow chamber. The interface 132 provides a coupling force ($F_{coupling}$) that secures the first section 112A and the second section 112B together. The resilient member 128 can impart a separating force ($F_{separating}$) that biases the arc emitter 120 toward at least one of the first section 112A or the second section 112B. The separating force can have a magnitude that is less than a magnitude of the coupling force. In some embodiments, the coupling force is provided at the interface 132 by at least one of a static frictional force, an adhesive force, or a normal force (e.g., a force countering a downward gravitational force) provided at a notch 136 of the interface 132. In some embodiments, the coupling force is stronger than is possible for a person to overcome by hand, either intentionally or inadvertently.

In some embodiments, the frame 112 includes at least one of a metal (e.g., aluminum) or other thermally conductive material. In some embodiments, the frame 112 is formed by molding. In some embodiments, the frame 112 is anodized (e.g., includes anodized aluminum, as set forth more fully below). In some embodiments, the frame 112 includes an electrical insulator, for example anodized aluminum and/or thermoplastics (e.g., PEEK, Torlon, Vespel, etc.). In some embodiments, at least one of the first end 104 or the second end 108 of the frame 112 includes a threaded region shaped to engage a complementary component. In some embodiments, the electrode 120 includes the resilient element 128 such as a spring.

In some embodiments, an external surface of the cartridge 100 is shaped to connect to, or mate with, a retaining cap or a cartridge cap (not shown). In some embodiments, the retaining cap is replaceable, threaded, and/or snap-on. The cartridge cap can be disposed about (e.g., can surround) the second end 108 of the frame 112. The cartridge cap can be shaped to contact the arc emitter 120 and to retain the arc emitter 120 within the frame 112. The cartridge cap can define an aperture of the arc emitter 120. The cartridge cap can include a fluid sealing surface disposed about a circumference of the aperture of the arc emitter 120. In some embodiments, the cartridge cap substantially orients the electrode 120 and retains the electrode 120 within the cartridge 100. In some embodiments, the cartridge cap includes a seal.

The cartridge 100 can be a "consumable" cartridge or assembly of consumable components, e.g., the cartridge 100 can be replaced as a unit after it reaches the end of its useful life. The cartridge 100 can be a sealed unit that is not intended to have individual component parts replaced. In some embodiments, individual components are irremovably disposed within or integrated into the cartridge 100. For example, at least a portion of the electrode 120 and the contact start spring element 128 can be irremovably disposed within the frame 112, e.g., sealed within the frame 112 and/or not intended to be removed or replaced by an operator. In some embodiments, the cartridge 100 is a consumable component. In some embodiments, the components (e.g., frame 112 and arc constrictor 124) may be connected via press fits or other like means with tight tolerances and will degrade, fracture, or fail if separated.

Figure 2A:
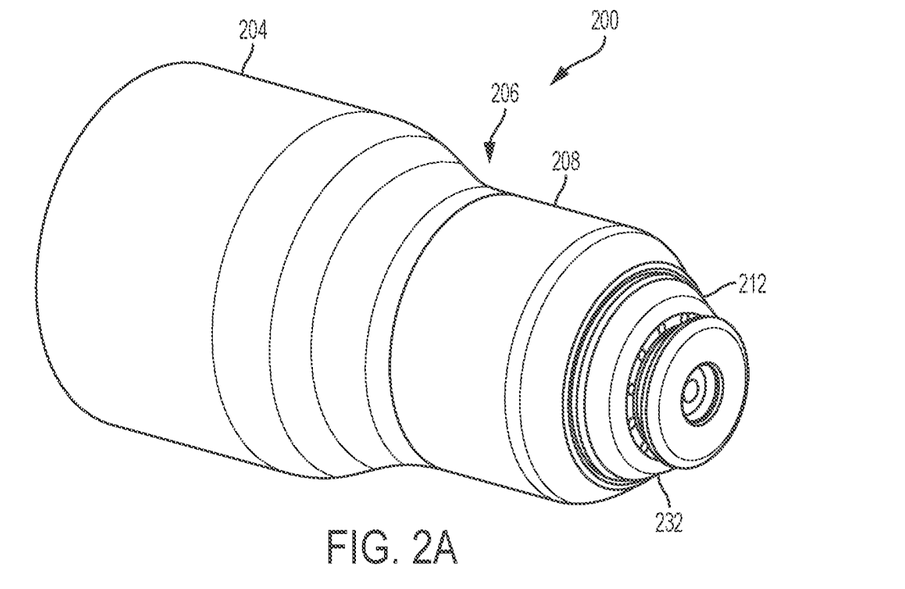
FIG. 2A is an isometric illustration of a unitary cartridge for a plasma arc cutting system, according to an illustrative embodiment of the invention.

FIG. 2A is an isometric illustration of a unitary cartridge 200 for a plasma arc cutting system, according to an illustrative embodiment of the invention. Visible from the exterior are a plastic exterior section 204, a metallic exterior section 208, and a copper exterior section 212 (e.g., a nozzle shield). The plastic exterior section 204 and the metallic exterior section 208 are joined at a junction 206. In some embodiments, the junction 206 is included in or near a tapered region. In some embodiments, the plastic exterior section 204 is a retaining cap. In some embodiments, the metallic exterior section 208 is a shield insulator. In some embodiments, the metallic exterior section 208 is formed substantially of a material other than copper. In some embodiments, the copper exterior section 212 is formed of a pure or substantially pure copper or copper alloy. The components of the cartridge 200 are seen in more detail in FIG. 2B, described below.

Figure 2B:
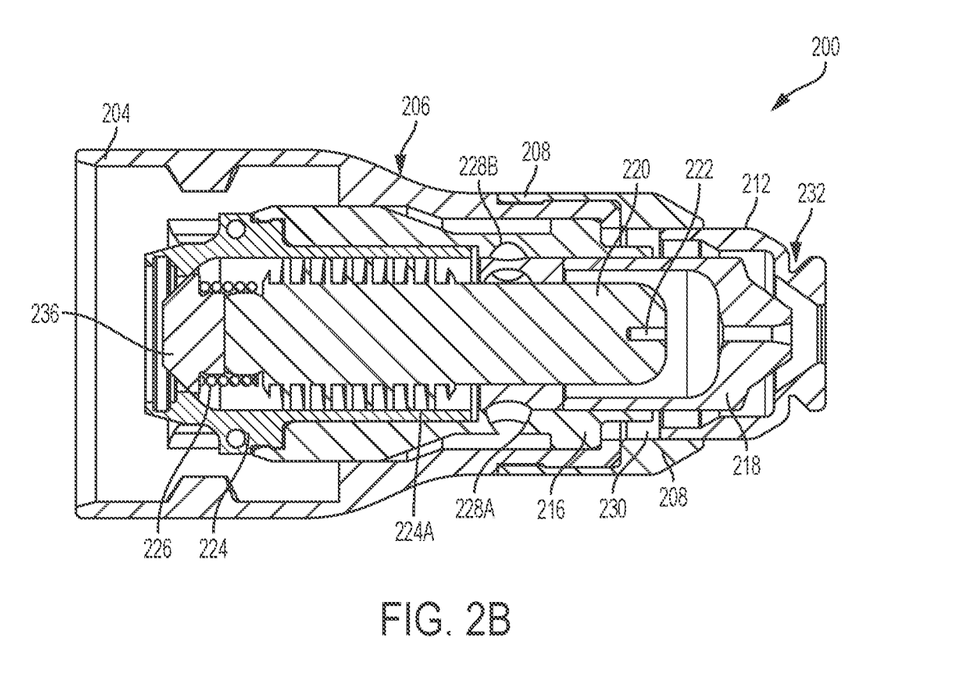
FIG. 2B is a cross-sectional illustration of a unitary cartridge for a plasma arc cutting system, according to an illustrative embodiment of the invention.

FIG. 2B is a cross-sectional illustration of a unitary cartridge 200 for a plasma arc cutting system, according to an illustrative embodiment of the invention. In this view, additional elements of the cartridge 200 are visible, including a nozzle body 216, a nozzle orifice 218, an electrode 220 having an emitting element 222, an insulator sleeve 224 having an elongated portion 224A, a resilient element 226, and an electrode contact button 236 (e.g., made of brass). In the present invention, one or more of these elements can be redesigned to achieve one or more of the objectives set forth above.

For example, the nozzle body 216 can be formed from a conductive material (e.g., a highly conductive material such as aluminum) and can be attached to (e.g., can be in direct physical contact with) other parts of the cartridge 200. In some embodiments, the nozzle body 216 is in thermal communication with certain parts of the cartridge 200 (e.g., via thermal conduction) but electrically isolated from other parts. For example, the nozzle body 216 can function as a heat sink for the nozzle orifice 218 while remaining electrically isolated from the nozzle shield 212. Such a configuration can enhance cooling performance (for example, of the nozzle and the electrode) and reduce manufacturing costs by comparison to previously used materials (e.g., as Vespel™). In some embodiments, the cartridge has a region with a thermal conductivity of between about 200-400 Watts per meter per degree Kelvin (for example, aluminum may have a thermal conductivity of between 200-250 W/m-° K, while copper may have a thermal conductivity of between 350-400 W/m-° K). In some embodiments, the consumable cartridge has a heat capacity to current ratio of 2-4 W/m-° K-A.

In addition, the nozzle body 216 includes a set of inlet swirl holes 228 (e.g., swirl holes 228A and 228B). In some embodiments, the set of inlet swirl holes 228 includes five swirl holes, or optionally between three and ten swirl holes. The swirl holes 228 can be radially offset to impart a swirl flow (e.g., radial and tangential velocity components) to gases flowing therethrough (e.g., a shield gas, plasma gas, and/or a plenum gas). In this configuration, the nozzle body 216 provides the swirl function previously provided by a swirl ring, thus eliminating the need for a traditional swirl ring. In addition, in some embodiments the nozzle body 216 is formed via a molding process, thus eliminating the need for expensive and time-consuming drilling procedures to create the swirl holes. In some embodiments, the nozzle shield 212 includes an angle 232 that helps redirects fluid flow away from the plasma arc during operation.

Figure 2C:
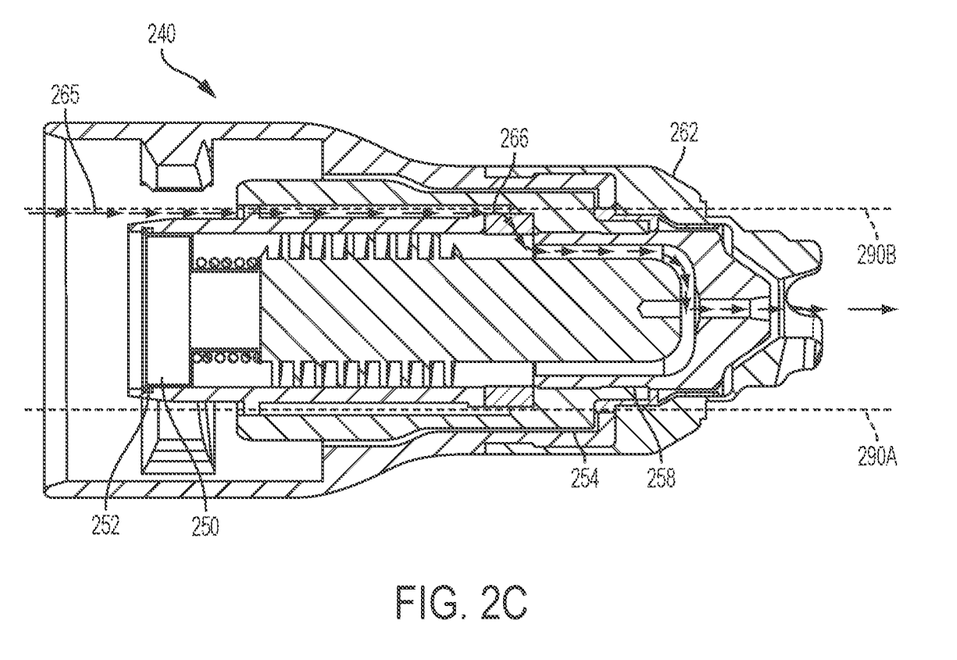
FIG. 2C is a cross-sectional illustration of a unitary cartridge for a plasma arc cutting system, according to an illustrative embodiment of the invention.

FIG. 2C is a cross-sectional illustration of a unitary cartridge 240 for a plasma arc cutting system, according to an illustrative embodiment of the invention. The unitary cartridge 240 can be similar in many respects to the cartridge 200 shown in FIG. 2B but can differ in certain other respects. For example, the cartridge 240 utilizes a stamped torch interface 250 (e.g., a stamped pieces of copper) having a cross-sectional "T"-shape. The interface 250 can allow the electrode to slide more freely than in the FIG. 2B configuration, which uses an electrode with a nipple feature that forms a mating surface with the spring. In FIG. 2C, the cap and the nozzle body have been opened to ease manufacture and allow the electrode to slide freely into the nozzle body during cartridge assembly. The spring can then rest on the electrode, and the stamped torch interface 250 can use a small tab feature 252 to snap readily into the nozzle body, securing the electrode therein. Such a configuration avoids the need to press fit multiple pieces together (and, in turn, avoids the need to have to achieve tight tolerances between pieces) and/or the need to assemble different pieces of the torch from different directions. Using the cartridge 240, a manufacturer can simply slide the electrode into place in one step.

In addition, the cartridge 240 uses a molded, slotted swirl feature 266 to achieve the swirling function instead of using holes drilled in the nozzle body. In this configuration, during operation gas flows out of the slots 266 and into the plasma chamber to form the swirl gas about the plasma arc. During operation, gas may also flow through molded gas shield channel 254, further cooling the nozzle body. Slots 266 form a set of swirl holes once the nozzle body, nozzle orifice, and/or nozzle liner are connected. Gas delivered to the slots is conveyed from the torch through a chamber defined by an internal surface of the nozzle body and an external surface of the nozzle liner (which, in combination, form the swirl holes). Such a configuration eliminates post-process machining steps and the associated expenses. In addition, the cartridge 240 includes a radial swage connection 258 between the nozzle orifice and the nozzle body. The radial swage connection 258 provides a robust connection interface to allow contact to be maintained between the nozzle orifice and the nozzle body, but also exposes significant surface area for heat to be conducted from the nozzle orifice to the nozzle body. Finally, in this embodiment, the electrode sleeve is removed and replaced with a more traditional heat exchanger.

Figure 3A:
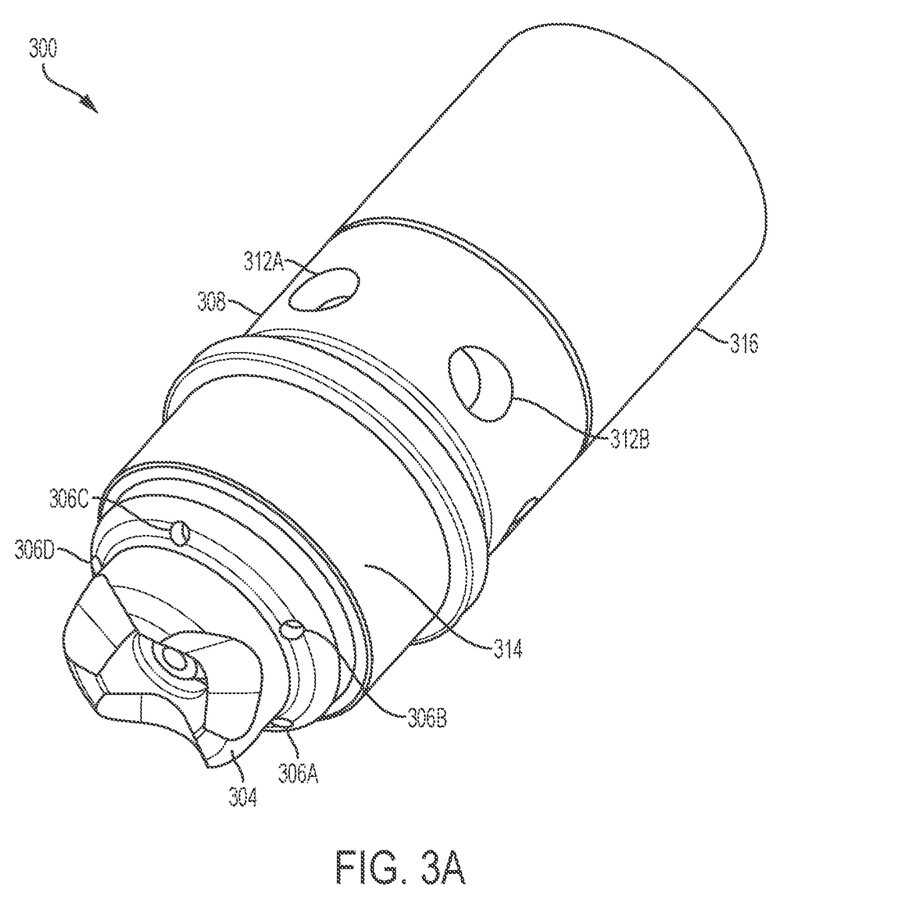
FIG. 3A is an isometric illustration of an inner cartridge assembly for a plasma arc torch, according to an illustrative embodiment of the invention.

FIG. 3A is an isometric illustration of an inner cartridge assembly 300 for a plasma arc torch, according to an illustrative embodiment of the invention. Visible from the exterior are a shield 304 having vent holes 306 (e.g., holes 306A-D as shown), a nozzle body 308 having flow holes or inlet swirl holes 312 (e.g., holes 312A, 312B as shown in FIG. 3A), a front insulator (or shield insulator) 314, and a rear insulator (or lock ring) 316. These and additional elements are described more fully in conjunction with the cross-sectional view shown in FIG. 3B below.

Figure 3B:
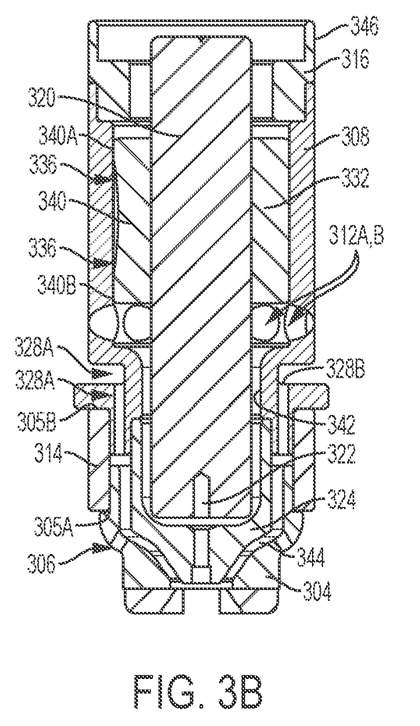
FIG. 3B is a cross-sectional illustration of an inner cartridge assembly for a plasma arc torch, according to an illustrative embodiment of the invention.

FIG. 3B is a cross-sectional illustration of the inner cartridge assembly 300 of FIG. 3A, according to an illustrative embodiment of the invention. In this view, several additional components of the inner cartridge assembly 300 are visible, including an electrode 320 having an emitting element 322, an arc constrictor or nozzle orifice 324, shield flow holes 328 (e.g., flow holes 328A-B as shown) directed toward the nozzle orifice 324, an insulator sleeve 332, and a cooling gas flow channel 336. In this embodiment, the nozzle body 308 functions as the cartridge frame to which other parts attach.

A number of features of the inner cartridge assembly 300 can enhance its cooling capabilities. First, the nozzle body 308 can be made of aluminum, which can enhance heat conduction over previous materials and configurations as described above. Second, the nozzle orifice 324 can be made of copper and can be pressed onto the nozzle body 308. In such embodiments, the nozzle body 308 can serve as a heat sink for the copper nozzle orifice 324. Third, improved gas flow surfaces, can assist in cooling, e.g., with shield gas flowing forward through holes 328A, 328B just outside of the press area. A press fit arrangement can also provide improved thermal conduction paths between torch parts as a result of tight tolerances between the surfaces of the parts. In some embodiments, the press fit arrangement includes an interference fit and/or a tabbed or interlocking fit having one or more step-like features. In addition, the small size of the press fit design has the additional advantages of reducing manufacturing and/or material costs and simplifying manufacture and assembly of the components (e.g., by having fewer parts).

The nozzle shield 304 can also be made of copper and can be pressed onto an anodized aluminum insulator 314 at a surface 305A. This assembly can then be pressed onto the nozzle body 308 at a press fit surface 305B. In such embodiments, the shield insulator 314 connects the nozzle body 308 to the shield 304. In some embodiments, the shield insulator 314 is press fit to the nozzle body 308. In some embodiments, the shield insulator 314 is an electrically insulative ring and/or includes a set of press-fit surfaces 305A, 305B that connect the shield 304 and the nozzle body 308. The shield insulator 314 can connect the nozzle body 308 to the shield 304 such that the nozzle body 308 and the shield 304 are electrically insulated from one another while still transferring thermal energy to one another. In some embodiments, using a two-piece shield insulator can increase (e.g., double) electrical insulation abilities as a result of increasing contact surfaces.

The nozzle shield 304 can be considerably smaller than previous shields, allowing for efficient manufacture and assembly of components, improved durability, and greater assurances of proper orientation of cartridge parts relative to one another. By way of example, for a 45-amp system, a prior art stock shield might have a diameter of about one inch and a mass of about 0.04 pounds, whereas a cartridge shield in accordance with the current invention can have a diameter of about 0.5 inches with a mass of less than 0.01 pounds (e.g., about 0.007 pounds). For a 105-amp system, a prior art stock shield might have a diameter of about one inch with a mass of about 0.05 pounds, whereas a cartridge shield in accordance with the current invention can have a diameter of about a half inch with a mass of about 0.01 pounds (e.g., 0.013 pounds).

The smaller size configuration can carry significant advantages. First, components having a reduced mass have a reduced heat capacity, which allows the components to be rapidly cooled during post-flow and/or allows more heat to be transferred to the cooling gas during operation. Second, a smaller shield can attain comparatively higher temperatures during operation and can transfer more heat to the cooling gas. In some embodiments, the nozzle shield 304 is exposed to a cold gas entering the shield area, e.g., via shield flow holes 328, which can further reduce the temperature. The flow holes 328 can each have a total cross sectional area of at least about one square inch.

In some embodiments, the electrode 320 includes a base made of copper. In some embodiments, the electrode 320 base has a small diameter with a pressed-on insulator sleeve 332 made of anodized aluminum and/or plastic used for electrical isolation. In some embodiments, a cooling gas flow channel or gap 336 exists between the insulator sleeve 332 and the nozzle body 308. In some embodiments, a cool gas flows in the gap 336. In some embodiments, a "dumbbell" configuration 340 defined by two end contacts 340A, 340B is used, which can reduce or minimize contact area between the nozzle body 308 and the insulator sleeve 332. Such a configuration can reduce friction between parts.

In some embodiments, the sleeve 332 contacts the electrode 320, which can be part of a separate current path from the nozzle body 308 and/or a different portion of the current path from the nozzle body 308. In some embodiments, the electrode 320 and the nozzle body 308 can be electrically separated by a gap to create the arc and/or to ensure proper orientation of the parts in the torch. In such embodiments, the nozzle 308 and the electrode 320 can be in physical contact between the sleeve 332 and the nozzle body 308. In such embodiments, insulative layers are needed in this region so that current is able to pass through the emitting element 322.

In some embodiments, a wall of the nozzle body 342 near which the electrode 320 moves can stay comparatively cool during operation as gas flow passes both on the inside of the nozzle body 308 and directly across an exterior surface 344 of the nozzle 324. The material choice (e.g., aluminum or another metal) for the nozzle body 342 design provides for a better conduction path and heat sink ability as compared with previous materials such as Vespel™ Such factors assist in cooling the electrode isolation piece and allow the electrode to function even after a deep pit is formed in the emitting element from electrode use.

In some embodiments, a lock ring 316 (or isolation ring) forms an interface 346 between the cartridge 300 and the torch. In some embodiments, the lock ring 316 can be made of anodized aluminum. The lock ring 316 can be pressed into the nozzle body to "trap" the moveable electrode 320. The lock ring 316 can contain the components within the cartridge 300 and electrically isolate the torch. In some embodiments, the lock ring 316 is replaced by heat shrinking or gluing. In some embodiments, the lock ring 316 is shaped to orient the cartridge 300 (e.g., axially), to optimize gas flow, to enable electrical connection to the cathode, and/or to provide electrical isolation.

In various embodiments described herein, the cartridges or consumable assemblies are about 3.5 inches in length and 1.1 inches in diameter. In some embodiments, the retaining cap is considered part of the torch, e.g., not a consumable component. In such configurations, machining steps can be minimized, with no machining necessary after assembly (as compared to some torch assemblies that require a final machining step to achieve functional axiality of the cartridge). In some embodiments, the reduction in swirl holes can minimize drilling operations compared to prior art swirl rings. In some embodiments, replacing Vespel™ with aluminum can significantly reduce manufacturing costs of the cartridge. In some embodiments, copper is used only in certain locations in the electrode, nozzle, and/or orifice, which can reduce manufacturing costs by reducing the use of this expensive material. For example, copper can be concentrated primarily in an inner core or region. While copper can be desirable for its thermal and electrical properties, it is also more expensive than other materials, and so designs that minimize its usage are sought.

Figure 4A:
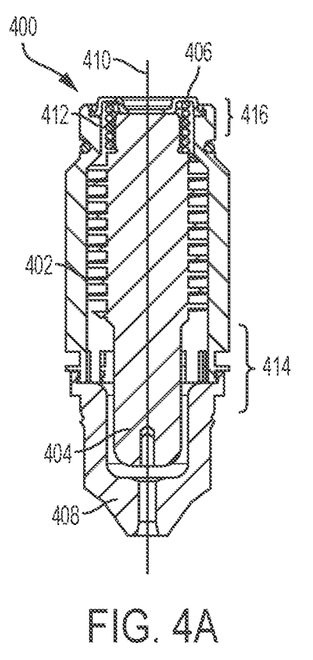
FIGS. 4A-4B are cross-sectional illustrations of consumable cartridges for a plasma arc cutting system, each cartridge having a nozzle, an electrode, a swirl ring, a resilient element and an end cap, according to illustrative embodiments of the invention.
Figure 4B:
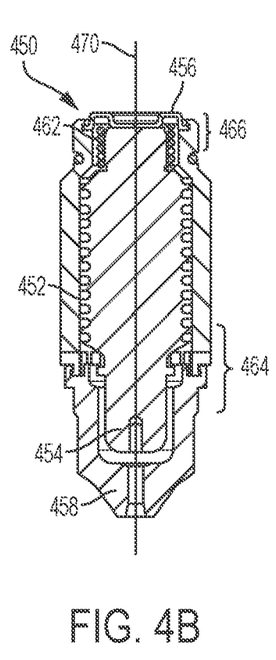
Figure 5:
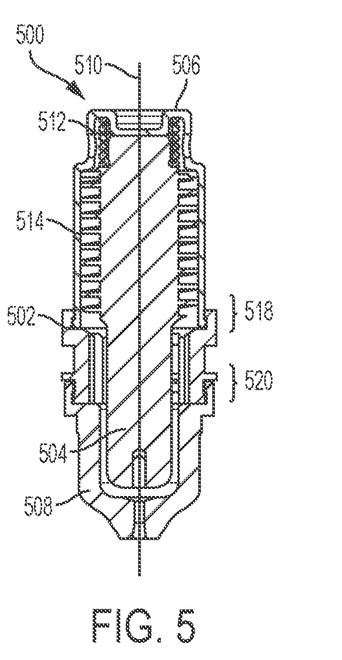
FIG. 5 is a cross-sectional illustration of a consumable cartridge for a plasma arc cutting system having a nozzle, an electrode, a swirl ring, a resilient element and an end cap, according to illustrative embodiments of the invention.

FIGS. 4A-4B and 5 are cross-sectional illustrations of consumable cartridges for a plasma arc cutting system, each cartridge having a nozzle, an electrode, a swirl ring, a resilient element and an end cap, according to illustrative embodiments of the invention. FIG. 4A shows an exemplary cartridge design 400. As shown, the cartridge 400 includes a swirl ring 402, an end cap 406, a nozzle 408 and an electrode 404. The electrode 404 can be a spring-forward electrode for a contact start plasma arc torch, where a resilient element 412 (e.g., a spring) exerts a separating force on the distal end of the electrode 404 to bias the electrode 404 away from the end cap 406 and toward the nozzle 408. The resilient element 412 can also be a part of the cartridge 400. The cartridge 400 can include a starting mechanism for contact starting a plasma arc torch upon assembly into the torch.

The swirl ring 402 can extend substantially over the length of the electrode 404 along a longitudinal axis 410 of the electrode 404. In some embodiments, the swirl ring 402 is manufactured through injection molding of high-temperature thermoplastics (e.g., PAI, PEI, PTFE, PEEK, PEK-PEKK, etc). Use of thermoplastics to manufacture swirl rings can reduce cartridge cost in comparison to Vespel™, which is a material that has been used to manufacture swirl rings, but is comparatively more expensive. It is known that thermoplastics have operating temperatures that are lower than Vespel™ (a thermoset), which can impact the integrity of swirl rings and electrode life. However, the cartridge designs of the present technology, which can incorporate swirl rings made from thermoplastics resins having various fortifying additives that provide the desired thermal resistance and/or thermal conductivity (e.g., glass fibers, minerals, boron nitride (BN), and/or Cubic BN), have resolved the high temperature performance issues, thus enabling the effective use of thermoplastics in these cartridges. This is achieved since (1) thermoplastics have a sufficiently high-temperature resistance and (2) a cartridge design that properly incorporates thermoplastics can avoid exposure of the thermoplastics to excessive temperatures during operation. In addition, when an electrode experiences an end-of-life event, which is also the end of life of the cartridge, the simultaneous melting of the plastic material is not problematic.

The end cap 406 can be made of a conductive material, such as copper. The end cap 406 can be inexpensively formed via stamping from a material blank and can be irremovably inserted, press fit or over molded onto the cartridge 400. The end cap 406 is configured to contain the resilient element 412 within the cartridge 400 and compress the resilient element 412 against the distal end of the electrode 404 such that the resilient element 412 exerts a separating force on the distal end of the electrode 404 to bias the electrode 404 toward the nozzle 408. In some embodiments, end cap 406 may be shaped to matingly engage a patterned torch head and/or may include a set of fluid flow holes formed therethrough.

In some embodiments, an unreleasable snap-fit interface 414 is formed between the swirl ring 402 and the nozzle 408 to join the two consumable components together as a part of the cartridge 400. In addition, a second snap-fit interface 416 can be formed between the swirl ring 402 and the end cap 406 to join the two consumable components together as a part of the cartridge 400. Other manufacturing and assembly options are available and viable. For example, the swirl ring 402 can be over-molded onto the end cap 406. The end cap 406 can also be capsulated by the swirl ring 402 and the resilient element 412 (e.g., a spring), where the end cap 406 can move within the cartridge 400.

FIG. 4B shows another exemplary cartridge design 450. As shown, the cartridge 450 includes a swirl ring 452, an end cap 456, a nozzle 458 and an electrode 454. In some embodiments, the cartridge 450 also includes a resilient element 462 that functions similarly as the resilient element 412 of FIG. 4A. The cartridges of FIGS. 4A and 4B have different electrodes (e.g., different sizes of heat exchanger flanges, circumferential flange for uniform flow), different nozzles (e.g., different swirl ring attachment), and different swirl rings (e.g., different swirl holes and attachment). In the cartridge design 450 of FIG. 4B, an interface 464 is formed as the swirl ring 452 is inserted into position in relation to the nozzle 458. Another interface 466 can be formed between the swirl ring 452 and the end cap 456.

FIG. 5 shows another exemplary cartridge design 500. As shown, the cartridge 500 includes a swirl ring 502, a sleeve 514, an end cap 506, a nozzle 508 and an electrode 504. In some embodiments, the cartridge 500 also includes a resilient element 512 that functions similarly as the resilient element 512 of FIG. 4A. The sleeve 514 and/or end cap 506 can be made from a conductive material (e.g., copper) using a stamping method. The sleeve 514 can be press fit or over molded onto the cartridge 500. The end cap 506 can be a part of the sleeve 514. Therefore, the sleeve 514 and the end cap 506 can be constructed as a single component piece.

As shown, the swirl ring 502 can be relatively short in comparison to the swirl ring 402 such that the swirl ring 502 only extends along a portion of the length of the electrode 504 in the longitudinal axis 510. Similar to the swirl ring 402, the swirl ring 502 can be manufactured through injection molding of high-temperature thermoplastics (e.g., Torlon™). A snap-fit interface 520 can be formed between the swirl ring 502 and the nozzle 508 to join the two consumable components together as a part of the cartridge 500. Another snap-fit interface 518 can be formed between the swirl ring 502 and the sleeve 514 to join the two consumable components together as a part of the cartridge 500. Alternatively, the swirl ring 502 can be over-molded onto the sleeve 514.

There are many benefits associated with using a cartridge in a plasma arc torch. First, such a design promotes ease of use through quick change capabilities, short setup time and ease of consumable selection for an end user. It also provides consistent cut performance because a suite of consumables are changed at once when the cartridge is changed. In contrast, variation in performance is introduced when components are changed individually at different times. For example, long term re-use of the same swirl ring can cause dimensional alteration after each blow-out, thereby altering the performance quality even if all other components are changed regularly. In addition, since the manufacturing and/or installation cost of a cartridge is lower than the combined cost of a set of consumables, there is a lower cost associated with per cartridge change than per change of a set of consumables. Furthermore, different cartridges can be designed to optimize torch operation with respect to different applications, such as marking, cutting, maintaining long life, etc.

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A replaceable sealed cartridge member for a plasma arc torch, the replaceable sealed cartridge member comprising:
   a substantially hollow frame including a first substantially hollow portion having a first end and a second substantially hollow portion having a second end, the first and second ends defining a longitudinal axis therethrough, the first end of the substantially hollow frame configured to mate with the plasma arc torch;
   an arc emitter slidably positioned and disposed at least partially within the frame, the arc emitter translatable relative to the frame;
   a swirl ring extending along at least a portion of a length of the arc emitter in a direction of the longitudinal axis, an unreleasable interface between the hollow frame and the swirl ring, the unreleasable interface joining components as part of the replaceable sealed cartridge; and
   an electrically conductive contact element at the first end of the frame, a resilient element located between the arc emitter and the electrically conductive contact element;
   wherein the replaceable sealed cartridge member is configured to be replaced as a unit after it reaches the end of the life of any constituent component of the replaceable sealed cartridge member.

2. The replaceable sealed cartridge member of claim 1 wherein the unreleasable interface is a press-fit interface.

3. The replaceable sealed cartridge member of claim 1 wherein the unreleasable interface is a snap-fit interface.

4. The replaceable sealed cartridge member of claim 1 wherein the first and second substantially hollow portions are joined at an interface to form the substantially hollow frame, the interface providing a coupling force that secures the first and second substantially hollow portions together.

5. The replaceable sealed cartridge member of claim 1 wherein at least a portion of the arc emitter and the resilient element are irremovably disposed within the substantially hollow frame.

6. The replaceable sealed cartridge member of claim 1 wherein the replaceable sealed cartridge member has a region with a thermal conductivity of between about 200-400 Watts per meter per degree Kelvin.

7. The replaceable sealed cartridge member of claim 1 further comprising a cap insert connected to the second substantially hollow portion of the replaceable sealed cartridge member, the cap insert substantially orienting the arc emitter and retaining the arc emitter within the substantially hollow frame.

8. The replaceable sealed cartridge member of claim 1 wherein the substantially hollow frame includes an electrical insulator.

9. The replaceable sealed cartridge member of claim 1 wherein the substantially hollow frame includes at least one of a metal or a strongly thermally conductive material.

10. The replaceable sealed cartridge member of claim 1 further including at least one set of flow holes, each flow hole in the set of flow holes radially offset from the other flow holes.

11. The replaceable sealed cartridge member of claim 1 wherein the arc emitter includes an electrode and the resilient element includes a spring.

12. The replaceable sealed cartridge member of claim 1 further comprising a nozzle joined to the swirl ring with a snap-fit interface formed between the nozzle and the swirl ring, thereby joining the nozzle with the swirl ring together as part of the cartridge.

13. A replaceable, unitary consumable assembly for a plasma arc torch, the consumable assembly comprising:
   a cartridge body having a first section and a second section, the first and second sections forming a substantially hollow chamber;
   an electrode included at least partially within the substantially hollow chamber and translatable relative to the cartridge body along a longitudinal axis defined between ends of the cartridge body;
   a swirl ring extending along at least a portion of a length of the electrode in a direction of the longitudinal axis, an unreleasable interface between the cartridge body and the swirl ring; and
   an electrically conductive contact element retained at least partially within the first section of the cartridge body, the contact start spring element located between the electrode and the electrically conductive contact element,
   wherein the replaceable, unitary consumable assembly is configured to be replaced as a unit after it reaches the end of the life of any constituent component of the replaceable, unitary consumable assembly.

14. The replaceable, unitary consumable assembly of claim 13 wherein the unreleasable interface is a press-fit interface.

15. The replaceable, unitary consumable assembly of claim 13 wherein the unreleasable interface is a snap-fit interface.

16. The replaceable, unitary consumable assembly of claim 13 wherein at least a portion of the electrode and the contact start spring element are irremovably disposed within the substantially hollow chamber.

17. The replaceable, unitary consumable assembly of claim 13 wherein the consumable assembly has a region with a thermal conductivity of between about 200-400 Watts per meter per degree Kelvin.

18. The replaceable, unitary consumable assembly of claim 13 further comprising a cap insert connected to the second section of the cartridge body, the cap insert substantially orienting the electrode and retaining the electrode within the cartridge body.

19. The replaceable, unitary consumable assembly of claim 13 wherein the cartridge body includes an electrical insulator.

20. The replaceable, unitary consumable assembly of claim 13 wherein the cartridge body includes at least one of a metal or a strongly thermally conductive material.

21. The replaceable, unitary consumable assembly of claim 13 further including at least one set of flow holes, each flow hole in the set of flow holes radially offset from the other flow holes.

22. The replaceable, unitary consumable assembly of claim 13 further comprising a nozzle joined to the swirl ring with a snap-fit interface formed between the nozzle and the swirl ring, thereby joining the nozzle with the swirl ring together as part of the assembly.

\* \* \* \* \*